UNITED STATES PATENT OFFICE.

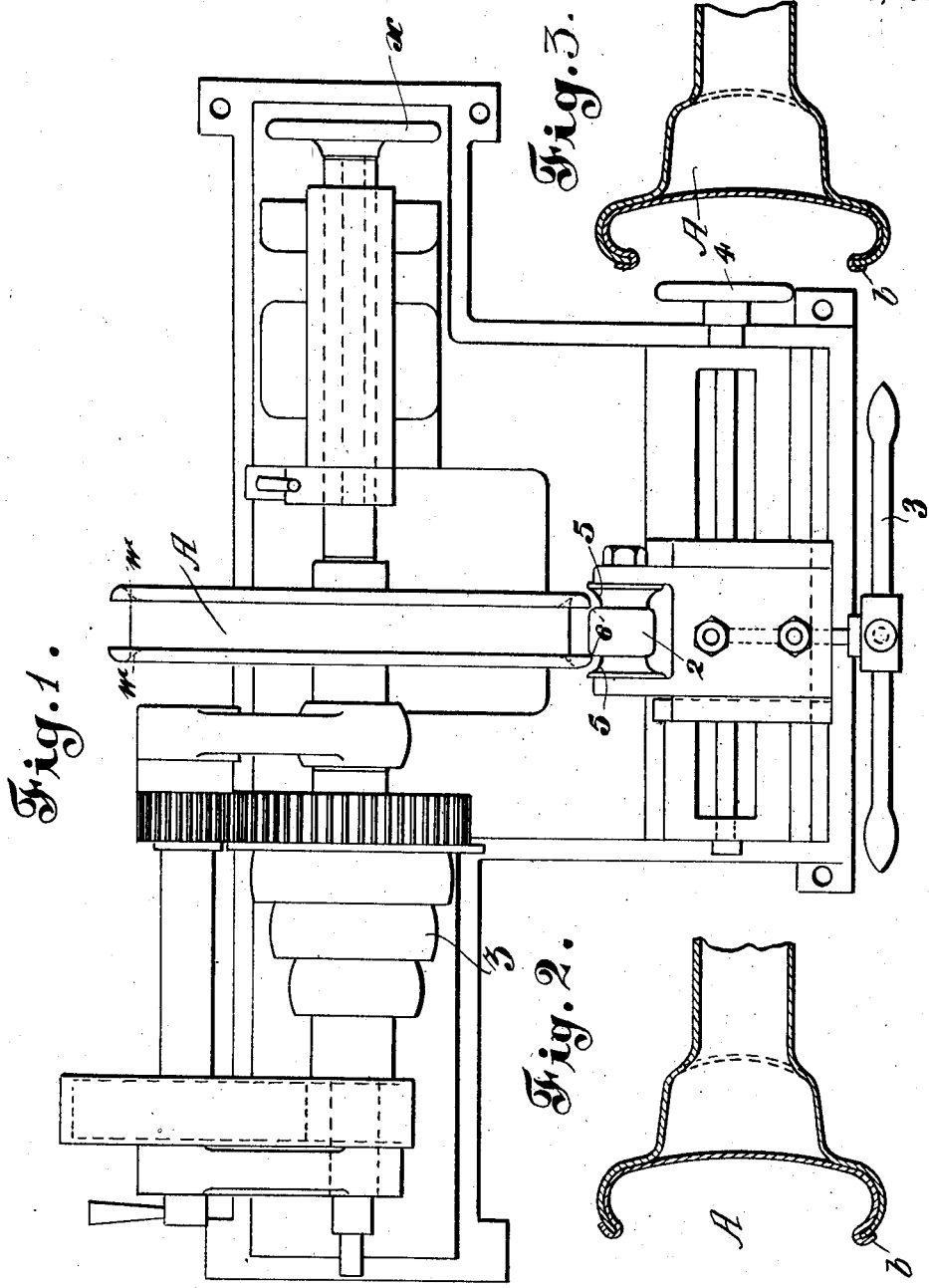

ERNEST FREDERICK GOODYEAR, OF DUDLEY, ENGLAND.

MACHINE FOR FINISHING METALLIC WHEEL-RIMS.

1,333,170.     Specification of Letters Patent.     Patented Mar. 9, 1920.

Original application filed June 24, 1919, Serial No. 306,417. Divided and this application filed January 6, 1920. Serial No. 349,797.

*To all whom it may concern:*

Be it known that I, ERNEST FREDERICK GOODYEAR, a subject of the Kingdom of Great Britain, of Churchfield Mills, Dudley, in the county of Worcester, England, have invented certain new and useful Improvements in Machines for Finishing Metallic Wheel-Rims, of which the following is a specification.

This invention relates to improvements in machines for shaping the side flanges of metallic wheel rims, and particularly the rims of wheels of the type composed of two sheaves or halves, and a separate rim portion, the edges of which are outwardly folded over the edges of the sheaves or halves. These three elements are combined together in such a manner that the rim portion assumes a cross-section of shallow U-configuration, and afterward the sides of this rim portion are bent or curled inwardly by the application of driven rollers, one of which is located inwardly and the other outwardly of the side part of the said rim portion. The inner driven roller is of convex form and the outer driven roller is of concave form, so that a side part of the rim is thereby effectively molded or shaped between the appropriately shaped or formed peripheries of the rollers.

This invention is a division of my copending application for Letters Patent of the United States, Serial No. 306,417, filed June 24, 1919, allowed January 5, 1920.

In order that this invention may be clearly understood and readily carried into practice, reference may be had to the appended explanatory sheet of drawings, upon which:—

Figure 1 is a plan of a machine for shaping the side flanges of metallic wheel rims as constructed and arranged in accordance with a preferred embodiment of my invention.

Fig. 2 is a detail sectional view of the form which the wheel rim assumes after being operated upon by the machine described and claimed in my before mentioned application for Letters Patent of the United States.

Fig. 3 illustrates the final form which the wheel rim assumes after being operated upon by the machine described and claimed in this application.

The wheel after having been manufactured up to the form shown in Fig. 2 is transferred to the machine illustrated in plan in Fig. 1. This machine comprises means for rotatably mounting the wheel about a horizontal axis in the machine, for which purpose the machine is provided with plate-like members $w$ between which the wheel is adapted to be gripped. The edges of said members are beveled on their opposing sides to fit the shoulders of the under sides of the flanges of the rim portion of the wheel as indicated by dotted lines, the wheel rim being indicated at A. $x$ is a hand-wheel for relatively adjusting the said plates $w$ axially in order to receive the wheel. Rotation is adapted to be imparted to the said plates $w$ and thereby to the wheel from suitable gearing $z$. 2 is a roller which may not be positively driven, but which is carried in a bracket by which it is adapted to be advanced toward the rim in a direction in the plane of the wheel. This advancing of the roller 2 may be effected by any suitable mechanism operated, for instance, from the star wheel 3. 4 indicates a hand wheel for adjusting the roller 2 axially in relation to the wheel being operated upon. The roller 2 is adapted to inwardly curl or bend both edges of the rim simultaneously, and for this purpose it is furnished with surfaces 5, 5 of the form which the exterior of the rim is required to assume, when finished. Shoulders 6, 6, in the roller 2 are provided to form abutments limiting the extent to which the edges of the rim may be bent or rolled inwardly. As a result of the operation effected by this machine the rim is caused to assume the form shown in Fig. 4.

If a sufficient width or margin $b$ of metal of the annular member is folded over the edges of the sheaves, this margin of metal is in the rolling process intimately pressed into contact with the sheaves and a substantially water-tight joint is obtained. Cement may be included between the rim part and the sheaves before the folding process, and this may serve to render the joint sufficiently water-proof to render unnecessary any welding, brazing, or equivalent process.

What I claim as my invention and desire to secure by Letters Patent is:—

1. In a machine of the class described, the combination of a pair of work gripping members mounted for rotation and provided with means for moving them to gripping or releasing position, said members being circular and having their opposing sides beveled at the periphery to fit the rim flanges of finished work; and a roller also mounted for rotation and arranged opposite the space between said work gripping members and provided with shoulders to limit the extent to which the edges of the hook formations of the work may be displaced inwardly.

2. In a machine of the class described, the combination of a pair of work gripping members mounted for rotation and provided with means for moving them to gripping or releasing position, said members being circular and having their opposing sides beveled at the periphery to fit the rim flanges of finished work; and a roller also mounted for rotation and arranged opposite the space between said work gripping members and provided with shoulders to limit the extent to which the edges of the hook formations of the work may be displaced inwardly, and means to adjust said roller.

In witness whereof I have hereunto set my hand.

ERNEST FREDERICK GOODYEAR.